United States Patent [19]

Kelly, Jr.

[11] 4,425,714

[45] Jan. 17, 1984

[54] SIDING BOARD INSTALLATION TOOL

[76] Inventor: James B. Kelly, Jr., 1236 Edgmont, Des Moines, Iowa 50315

[21] Appl. No.: 387,240

[22] Filed: Jun. 10, 1982

[51] Int. Cl.³ .......... G01B 3/30

[52] U.S. Cl. .......... 33/187; 145/1 B

[58] Field of Search .......... 145/1 A, 1 B, 1 R; 33/188, 187

[56] References Cited

U.S. PATENT DOCUMENTS

| | | | |
|---|---|---|---|
| 108,010 | 10/1870 | Deyo | 33/187 |
| 248,460 | 10/1881 | Harris | 33/187 |
| 276,950 | 5/1883 | Woodard | 33/187 |
| 318,555 | 5/1885 | Essex | 33/187 |
| 328,661 | 10/1885 | Dunbar et al. | 33/187 |
| 337,825 | 3/1886 | Ervin | 33/188 |
| 476,257 | 6/1892 | Finmand | 33/187 |
| 1,598,986 | 9/1926 | Ping | 33/187 |
| 2,715,780 | 8/1955 | Hageman | 33/188 |
| 4,159,029 | 6/1979 | Matthews | 145/1 B |

*Primary Examiner*—Frederick R. Schmidt
*Assistant Examiner*—J. T. Zatarga
*Attorney, Agent, or Firm*—G. Brian Pingel

[57] ABSTRACT

A tool for assisting in the installation of horizontally overlapping siding boards for the exterior of a building including a body member and a gate member rotatably attached thereto. The body member has a head portion that forms a downwardly facing channel for hooking onto the upper edge of a siding board, and a mid portion that coacts with the head portion and the gate member to form an upwardly facing channel for receiving the lower edge portion of a siding board to be installed on the building. The gate member is moveable between open and closed positions whereby when installation of the siding board is completed, the gate member can be rotated to an open position for removal of the tool.

4 Claims, 6 Drawing Figures

SIDING BOARD INSTALLATION TOOL

BACKGROUND OF THE INVENTION

1. Field of the Invention

The present invention relates to a tool for assisting in the installation of horizontally overlapping siding boards on the exterior of a building, and more specifically relates to such tools that are adapted for ready removal from the building once installation of a board is completed.

2. Description of the Prior Art

As discussed in various patents, there is a substantial amount of prior art teaching a wide variety of tools that may be employed for assisting in the installation of horizontally overlapping siding boards on the exterior of a building. Specifically, see U.S. Pat. Nos. 4,164,346 and 4,208,799. However, generally the devices disclosed in such patents and the prior art listed therein consists of tools that are of substantially fixed structures which have proved to be inconvenient for rapid and efficient use. In contrast to such structures, U.S. Pat. No. 4,159,029 to Mathews discloses a tool that includes a semi-permanently attached member to facilitate removal of the tool from the building during siding board installation.

Although the device of the Mathews' patent appears to provide relatively convenient tool removal, its construction is deficient from the standpoint that it is awkward to use and relatively complex in structure. The present invention provides a tool that is relatively simplistic in construction and yet can be used for the rapid and convenient installation of siding boards.

SUMMARY OF THE INVENTION

The present invention provides a tool for assisting in the installation of horizontally overlapping siding boards on the exterior of a building, each board having an upper edge, a lower edge and an exposed exterior face. Preferably, the tool is formed with an upstanding body member having a head portion at one end, a handle portion at an opposite end and a mid portion connecting between the head and handle portions.

The head portion has a downwardly facing hook section for engaging the upper edge on a first siding board installed on the building. The mid portion is formed of two legs substantially orthogonal to one another with a short leg connected to the head portion and a long leg connected to the handle portion. A gate member is rotatably attached to the long leg of the mid portion and is moveable between a siding engagement position and a non-engagement position.

When the gate member is in its siding engagement position, the head portion, mid portion and gate member coact together to form an upwardly facing channel section for receiving the lower edge of a second siding board to be installed on the building in an overlapping relation to the first siding board. Thus, the tool serves as a cradle for assisting in holding the second siding board in a desired overlapping position with respect to the first siding board during installation of the second siding board on the building.

In a preferred embodiment, the handle portion is inclined to the long leg of the body mid portion to extend outwardly from the siding boards to be installed to facilitate use of the tool when it is associated with the siding boards. Also, the gate member includes a flange to provide a finger grip for convenience of rotating the gate member between its siding engagement and non-engagement positions. It is also preferred to form the head portion and the body portion each substantially in the shape of an inverted "L" so that together these two portions define a stair step configuration. In this way, a positive engagement is provided between the tool and the siding boards with which it is associated.

It is an object of the present invention to provide a siding board installation tool which is used in pairs to hold a siding board that is to be installed on a building in a desired overlapping relation to an adjacent board during installation on a building to ensure a unified degree of overlapping between all the boards. it is a further object of the invention to provide a siding board installation tool that is not only simplistic in construction, but also is simplistic in use for installing the siding boards.

Other objects and advantages of the invention will become known by reference to the following description and the accompanying drawings.

DESCRIPTION OF THE PREFERRED EMBODIMENT

Figure 1:
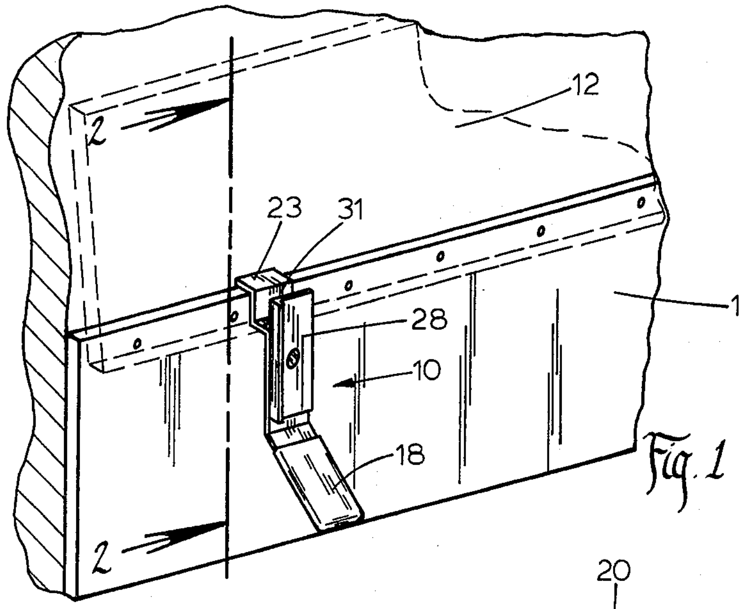
FIG. 1 is a fragmentary perspective view of the preferred embodiment of the holder of the present invention, positioned on the upper edge of a siding board and holding a siding board shown in dashed lines to be installed on a building.

Referring now to the drawings and with reference first to FIG. 1, a preferred embodiment of the tool of the present invention is shown at 10 in association with a first siding board 11 that is secured to the exterior of a building by nails and a secon siding board 12 that is in position for installation on the building. As shown best in FIG. 4, the tool 10 has an upstanding body member 16 that is preferrably integrally formed and includes a head portion 17 at one end, a handle portion 18 at an opposite end and a mid portion 19 connecting between the head and handle portions.

The head portion is substantially formed in the shape of a first inverted "L" having a short leg 20 and a long leg 21. In addition, the short leg 20 has a flange 22 on its free end so that the short leg 20, long leg 21 and flange 22 define a downwardly facing hook section 23 for engaging the upper edge of the siding board 11 (FIG. 1) to hold the tool 10 in a desired position with respect to the siding board 11.

The mid portion 19 is also formed in the shape of an inverted "L" and includes a short leg 26 and a long leg 27 with the head and mid portions 17, 19 connected together in such fashion that they define a stair step configuration.

The handle portion 18 is oriented on an incline with respect to the mid portion long leg 19 and preferrably includes an exterior covering 32 that is relatively soft and slip resistent for comfort and more convenient grasping of the tool 10 by users.

Figure 4:
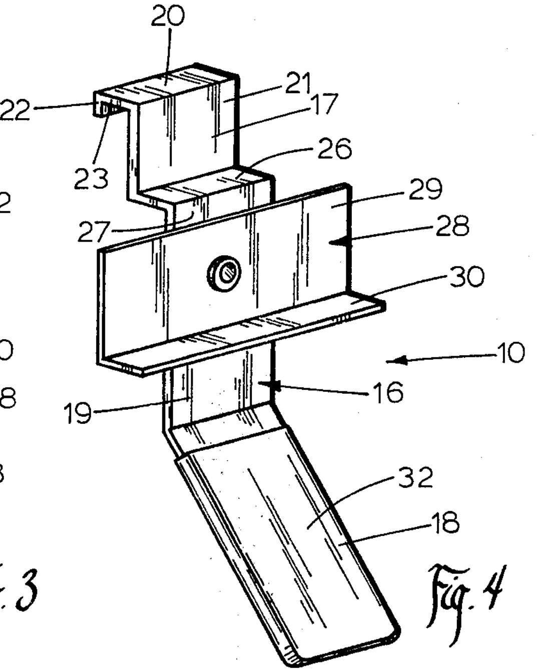
FIG. 4 is a perspective view of the tool of FIG. 1 shown with a gate member of the tool in an open position.
Figure 5:
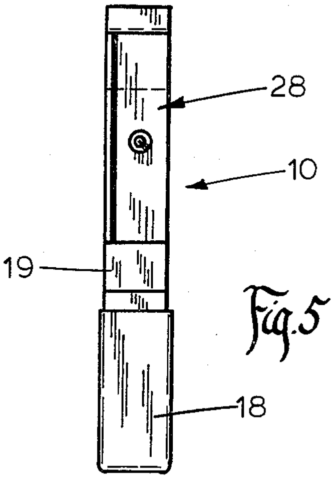
FIG. 5 is a front view in elevation of the tool member of FIG. 4, but with the gate member shown in a closed position.
Figure 6:
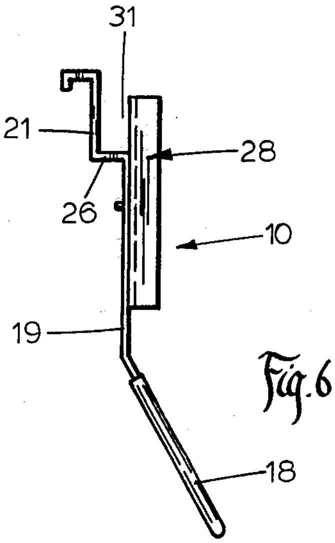
FIG. 6 is a side view of the tool of FIG. 5.

A gate member 28 is rotatably attached to the mid portion long leg 21 and is substantially formed of a planer wall section 29 that has an outwardly projecting ledge portion 30 on one side edge to serve as a finger hold for grasping the gate member 28 when it is desired to adjust the position thereof with respect to the body member 16. As shown by FIGS. 4, 5 and 6, the gate member is rotatably moveable between a closed siding engagement position (FIGS. 5 and 6) and an open non-engagement position (FIG. 4) for a purpose to be described more fully below.

When the gate member is in its closed siding engagement position, the head portion long leg 21, mid portion short leg 26 and a top end portion of the gate member 28 coact to define an upwardly facing channel section 31 (FIG 6) that serves as a cradle for receiving the lower edge portion of the siding board 12, as shown in FIG. 1.

Figure 2:
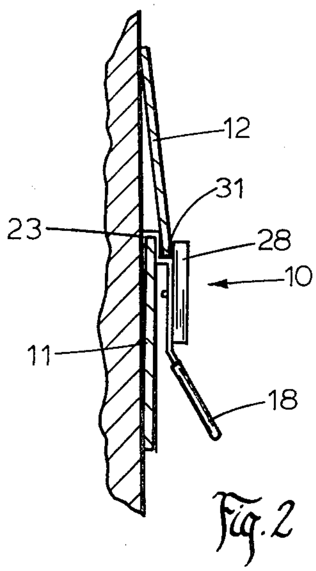
FIG. 2 is a cross sectional view taken on line 2—2 of FIG. 1.
Figure 3:
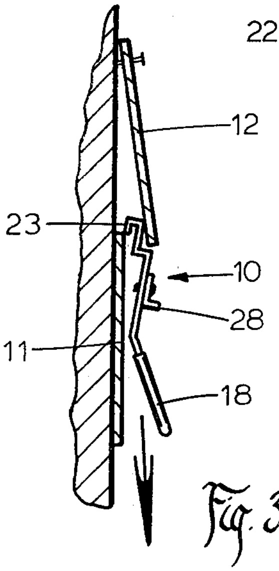
FIG. 3 is similar to that of FIG. 2 but with a gate member of the tool of the present invention shown in an open position for removal of the tool from engagement with the siding boards.

Referring now to FIGS. 2 and 3, when the tool 10 is employed for installing siding board on a building, it is first engaged on the upper edge of the siding board 11 by the hook section 23 of the head portion 17. Also, the gate member 28 is positioned in its closed siding engagement position. The siding board 12 is then positioned with its lower edge received in the upwardly facing channel 31 so that the tool 10 assists in supporting the siding board 12 in a desired overlapping relation to the siding board 11. Next, the siding board 12 is tacked to the exterior surface of the building with sufficient nails to hold the board 12 in position while the tool 10 is removed.

One of the principal advantages of the present invention is that the tool 10 can now be easily removed from contact with the siding boards 11 and 12. To accomplish such removal, all that need be done is to rotate the gate member 28 to its open non-engagement position which has the effect of removing one side wall of the channel 31. With the gate member 28 in this position, it is then a simple matter to lift the tool 10 with an upward movement to disengage the hook section 23 from the upper edge of the siding board 11 as shown in FIG. 3, and then pull the tool 10 from in between the siding boards 11 and 12. Thereupon, complete securement of the siding board 12 to the building can then be finished.

Thus, the present invention provides a siding board installation tool that, although simplistic in construction, is uniquely adopted to provide an efficient and easy-to-use means for the installation of siding board on a building.

What is claimed is:

1. A tool for assisting in the installation of horizontally overlapping siding boards on the exterior of a building, each board having an upper edge, a lower edge and an exposed exterior face, said tool comprising:

(a) An upstanding body member formed with a head portion at one end, a handle portion at an opposite end and a mid portion connecting between said head and handle portions and forming a transversely directed ledge therebetween; said head portion having a downwardly facing hook section for engaging the upper edge on one of said siding boards installed on said building whereby said tool depends from said upper edge;

(b) A gate member permanently attached to said mid portion of said body member and rotatably moveable in a plane generally parallel to the exposed exterior face of said one siding board between a siding engagement position and a non-engagement position; and (c) Said head portion, mid portion and gate member coact together when said gate member is in the siding engagement position to form an upwardly facing channel section for receiving the lower edge of a second siding board to be installed on said building in overlapping relation to said first siding board whereby when said tool is in a depending relation to said first siding board, said lower edge of said second siding board is supported on the ledge formed by said mid-portion so that said tool serves as a cradle for assisting in holding said second siding board in a desired overlapping position with respect to said first siding board during installation of said second board on said building, and is thereafter removable from said depending relationship with said first siding board by rotation of said gate member to said non-engagement position.

2. A tool for assisting in the installation of siding boards on a building as recited in claim 1 wherein said gate member is substantially formed of a planer wall section and has a projecting ledge on one side edge to provide a finger hold for grasping the gate member.

3. A tool for assisting in the installation of siding boards on a building as recited in claim 1 wherein said body member head and mid portions are each substantially formed in the shape of an inverted "L", and are connected together to define a stair step configuration.

4. A tool for assisting in the installation of horizontally overlapping siding boards for the exterior of a building, each board having an upper edge portion, a lower edge portion and an exposed exterior face, said tool comprising:

(a) an upstanding body member formed with a head portion at one end, handle portion at an opposite end and a mid portion connecting between said head and handle portions;

(b) said head portion substantially formed in the shape of a first inverted "l" and having a long leg, short leg and a flange on the free end of such short leg to form a downwardly facing hook section for engaging the upper edge portion of one of said siding boards installed on said building whereby said tool depends from said upper edge;

(c) said midportion substantially formed in the shape of a second inverted "L" and having a short leg and a long leg with the end of the short leg of said mid portion connected to the end of said long leg of said head portion so that said head and mid portions define a stair step configuration;

(d) a gate member permanently attached to the long leg of said mid portion and rotatably moveable in a plane parallel to the exposed exterior face of said one siding board between an open position and a closed position whereby when said gate member is in said closed position it is substantially parallel with the long legs of said mid and head portions so that said gate member and said long legs of said head and mid portions coact to define an upwardly facing channel section that serves as a cradle for receiving the lower edge portion of a second siding board to be installed on said building in overlapping relation to said first siding board whereby when said tool is in a depending relation to said final siding board, said lower edge of said second siding board is supported on the short leg of said mid portion so that said tool serves as a cradle for holding said second siding board in a desired overlapping position with respect to said first siding board during installation of said second board on said building; and (e) upon installation of said second board on said building, said gate member is moveable to said open position for removal of said tool from said first and second siding boards.

* * * * *